No. 618,729. Patented Jan. 31, 1899.
W. REED.
TIDE POWER.
(Application filed Jan. 26, 1898.)
(No Model.)
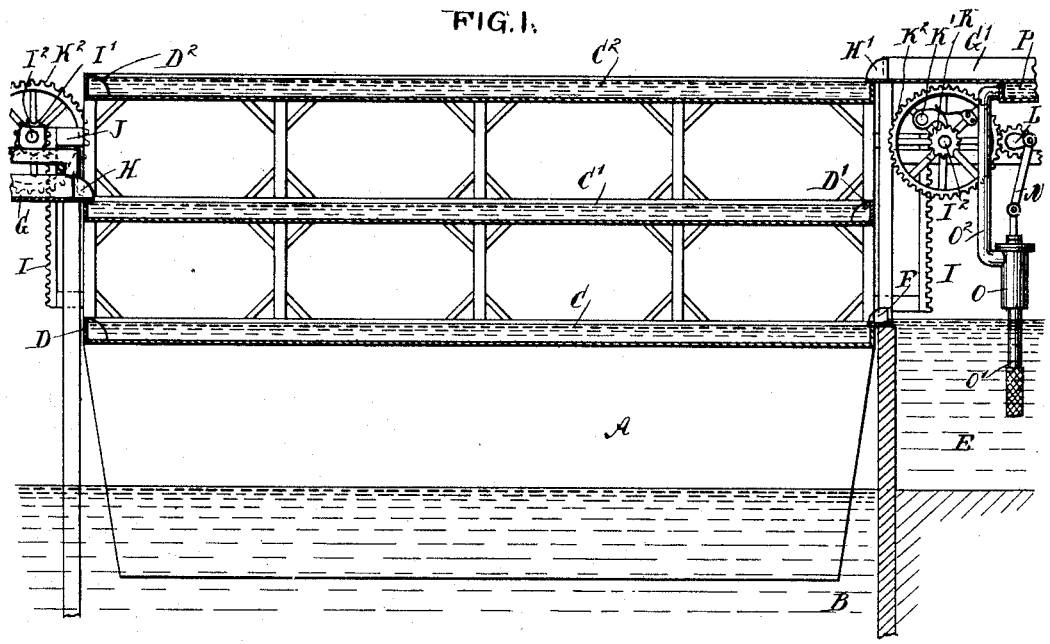
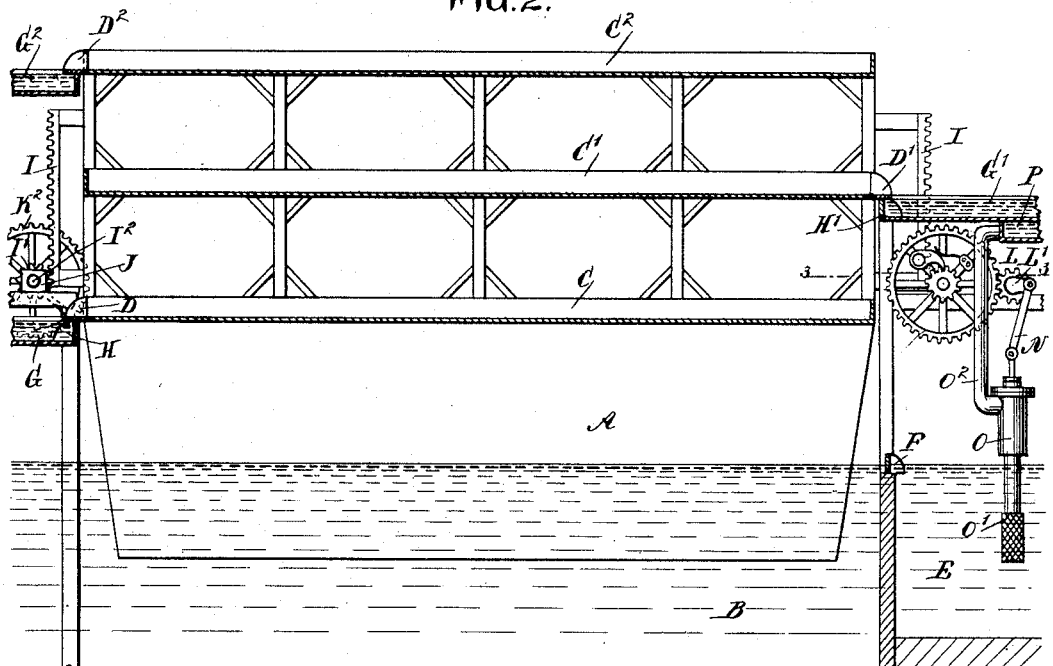
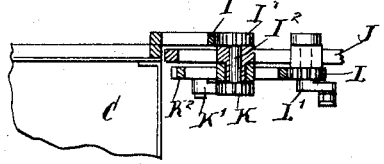
WITNESSES:
INVENTOR
W. Reed.
BY
ATTORNEYS.
THE NORRIS PETERS CO., PHOTO-LITHO., WASHINGTON, D. C.

UNITED STATES PATENT OFFICE.

WILLIAM REED, OF NEW YORK, N. Y.

TIDE-POWER.

SPECIFICATION forming part of Letters Patent No. 618,729, dated January 31, 1899.

Application filed January 26, 1898. Serial No. 667,999. (No model.)

*To all whom it may concern:*

Be it known that I, WILLIAM REED, of New York city, borough of Manhattan, county of New York, in the State of New York, have invented a new and Improved Tide-Power, of which the following is a full, clear, and exact description.

The invention relates to hydraulic engineering; and its object is to provide a new and improved tide-power for forming a head of water for driving turbines or other motors and for other purposes.

The invention consists of novel features and parts and combinations of the same, as will be described hereinafter and pointed out in the claims.

Reference is to be had to the accompanying drawings, forming a part of this specification, in which similar characters of reference indicate corresponding parts in all the figures.

Figure 1 is a sectional side elevation of the improvement in the position at low tide. Fig. 2 is a similar view of the same in the position at high tide, and Fig. 3 is a sectional plan view of part of the motor on the line 3 3 of Fig. 2.

A float A of suitable dimensions and in the form of a scow, for instance, is arranged at a suitable dock, basin, or like structure B, accessible to tide-water, so that the float A rises and falls with the tide. On the float A are arranged a plurality of water-receiving receptacles C C' C², preferably in the form of tanks and superimposed one over the other and supported by suitable framework carried by the float. The water-receiving receptacles are provided with gates D D' D², respectively, arranged on the sides or ends for allowing the water to flow from said receptacles, as hereinafter more fully described.

Alongside the structure B is arranged a water-supply reservoir E, likewise accessible to the ocean water and to be filled by the latter, a suitable gate being provided for closing the reservoir after it is filled and maintaining the reservoir filled during the receding of the surrounding water at low tide. A gate F is arranged on this reservoir E adjacent to the float A, so that when the latter is in a lowermost position at low tide then the lowermost water-receiving receptacle C is below the level of the water in the reservoir E, and when the gate F is now opened a portion of the water in the supply reservoir can flow into the water-receiving receptacle C to fill the same, as indicated in Fig. 1. Stationary reservoirs G G' G² are arranged adjacent to the float A and its superstructure and at different levels, the distance between two superimposed receptacles corresponding to the rise and fall of the float A and its receptacles C C' C². Thus the lowermost stationary reservoir G is a sufficient distance above the level of the ocean at high tide so that when the float A has risen to its uppermost position at high tide then the water contained in the lowermost receptacle C can be discharged into the reservoir G upon opening the gate D of said receptacle C. (See Fig. 2.) Now on the next downward movement of the float A the second receptacle C' is brought somewhat below the level of the stationary reservoir G to permit of discharging the water in this reservoir into the second receptacle C' upon opening a gate H, arranged in one side of the reservoir G. This takes place at low tide—that is, at the time the lowermost tide-receptacle C is again filled from the supply-receptacle E—as previously described. When the float A rises at the next high tide, it brings the filled receptacle C again to the position for filling the reservoir G, while the next receptacle C' is brought into such a position as to discharge its contents through the gate D' into the second stationary reservoir G', which latter is emptied into the receptacle C² on the next lowermost position of the float A, said receptacle C² then being in the position shown in Fig. 1—that is, below the reservoir G'—to permit the water to flow from the latter through the gate H' into the receptacle C² and fill the same. On the next rising of the float A the filled receptacle C² is brought above the third stationary reservoir G², and upon opening the gate D² the water flows from the receptacle C² into said reservoir G². Thus the water originally contained in the supply-reservoir E is lifted by the apparatus to the uppermost receptacle G², thus forming a head of water which can be readily utilized for driving turbines or other motors.

It is evident that whenever the float A is in a lowermost position at low tide the receptacle C is filled from the supply-reservoir E, the receptacle C' is filled from the reservoir G, and the receptacle $C^2$ is filled from the reservoir G', and when the float A is in an uppermost position at high tide the receptacle C discharges into the reservoir G, the receptacle C' discharges into the reservoir G', and the receptacle $C^2$ discharges into the reservoir $G^2$, thus forming the head of water.

It is evident that from the foregoing any number of receiving-receptacles C C' $C^2$ may be used on the float A, according to the floating capacity of the latter, and a corresponding number of stationary reservoirs G G' $G^2$ is then employed to successively lift the water to different levels to finally obtain a head of water having suitable pressure.

The float A when moving downward upon the receding of the water from the structure B is utilized to actuate a pump or other machine, and for this purpose I provide the superstructure of the float A on each side with a rack I, in mesh with a gear-wheel I', secured on a shaft $I^2$, journaled in suitable bearings in a framework J, supported from the adjacent ground. On the shaft $I^2$ is secured a ratchet-wheel K, engaged by a spring-pressed pawl K', fulcrumed on a gear-wheel $K^2$, mounted to rotate loosely on a bearing concentric with the shaft $I^2$, as is plainly indicated in Fig. 3. The gear-wheel $K^2$ is in mesh with a pinion L, secured on a crank-shaft L', connected by a pitman N with the plunger-rod of a pump O, having its suction-pipe O' extending into the water contained in the supply-reservoir E. The discharge-pipe $O^2$ of the pump O discharges the water pumped by the pump O into a suitable reservoir P, which may be used as a head of water for driving machinery. Now it is evident that during the downward movement of the float A the rack I moves with it, and thus turns the gear-wheel I', which by the shaft $I^2$ of the ratchet-wheel K and pawl K' turns the gear-wheel $K^2$ and transmits its motion by the pinion L to the crank-shaft L' to actuate the pump O for the purpose mentioned. During the upward movement of the float A and while lifting the water contained in the receptacles C C' $C^2$ the pump remains at a standstill, as the rack I merely turns the gear-wheel I' and the pawl K' glides over the ratchet-wheel K, turning with the gear-wheel I'.

Although the mechanism shown and described is actuated only on the downward movement of the float, it is evident that the upward movement of the float may be utilized for turning machinery similar to that described.

Having thus fully described my invention, I claim as new and desire to secure by Letters Patent—

1. A tide-power provided with a float arranged to rise and fall with the tide, and carrying a plurality of superimposed water-receiving receptacles, and stationary reservoirs at different levels and each adapted to be filled from a corresponding float-receptacle at high tide, and adapted to fill the next highest float-receptacle at low tide, substantially as shown and described.

2. A tide-power provided with a float arranged to rise and fall with the tide, a water-receiving receptacle carried by said float, and a stationary supply-reservoir arranged to fill said receptacle at low tide, substantially as shown and described.

3. A tide-power provided with a float arranged to rise and fall with the tide, a water-receiving receptacle carried by said float, a stationary supply-reservoir arranged to fill said receptacle at low tide, and a stationary reservoir above the level of the supply-reservoir, and adapted to receive the water from the float-receptacle at high tide, substantially as shown and described.

4. A tide-power provided with a float arranged to rise and fall with the tide and carrying a plurality of superimposed water-receiving receptacles, stationary reservoirs at different levels and each adapted to be filled from a corresponding float-receptacle at high tide, and adapted to fill the next float-receptacle at low tide, and a stationary supply-reservoir arranged to fill the lowermost float-receptacle at low tide, substantially as shown and described.

WILLIAM REED.

Witnesses:
THEO. G. HOSTER,
EVERARD BOLTON MARSHALL.